Figure 1:
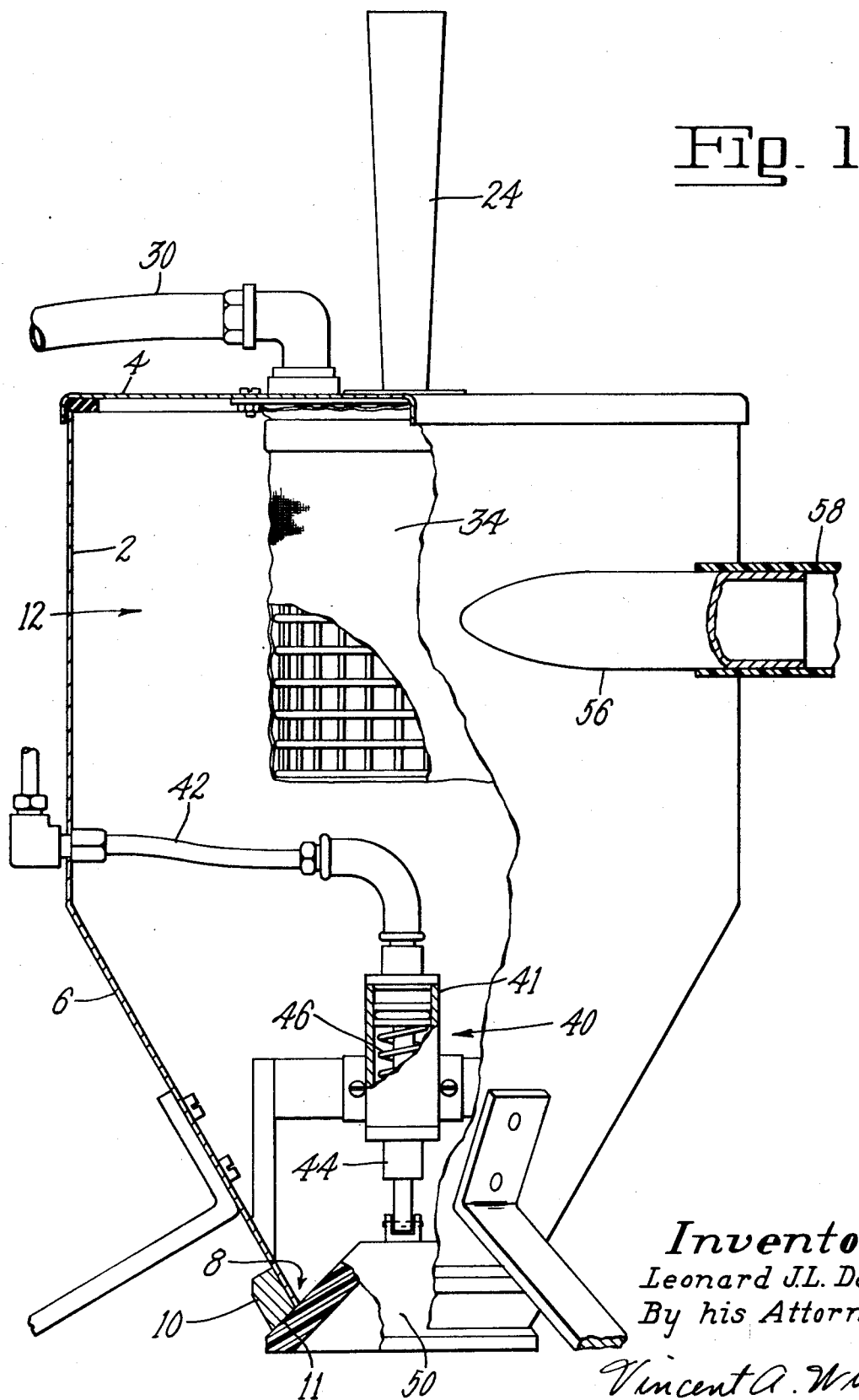

United States Patent [19]
Davies

[11] 3,737,074
[45] June 5, 1973

[54] APPARATUS FOR FEEDING PARTICULATE MATERIAL

[75] Inventor: Leonard J. L. Davies, Kettering, England

[73] Assignee: USM Corporation, Flemington, N.J.

[22] Filed: July 8, 1971

[21] Appl. No.: 160,588

[30] Foreign Application Priority Data

July 23, 1970 Great Britain..................35,642/70

[52] U.S. Cl..............................222/193, 302/59
[51] Int. Cl.............................B65g 53/50
[58] Field of Search...............302/21, 22, 25, 58, 302/59; 222/52, 56, 58, 193

[56] References Cited
UNITED STATES PATENTS

| | | | |
|---|---|---|---|
| 3,424,501 | 1/1969 | Young | 302/59 X |
| 1,305,726 | 6/1919 | Leonard et al. | 302/25 |
| 1,125,032 | 1/1915 | Goodell | 302/59 |
| 1,781,352 | 11/1930 | Tolman et al. | 302/59 |
| 3,219,394 | 11/1965 | Moss et al. | 302/59 |
| 1,772,881 | 8/1930 | Tolman | 302/59 |

FOREIGN PATENTS OR APPLICATIONS 313,232  12/1917  Germany..................302/59

Primary Examiner—Robert S. Ward, Jr.
Attorney—Richard B. Megley and Vincent A. White

[57] ABSTRACT

Apparatus including a substantially closed chamber having an inlet connected to a supply of granular material and an outlet for dispensing the material from the chamber, a valve for opening and closing the outlet, and a device for drawing air from the chamber when the valve is closed so a stream of air is drawn through the inlet to feed material to the chamber from the supply.

3 Claims, 3 Drawing Figures

Inventor
Leonard J.L. Davies
By his Attorney
Vincent A. White

APPARATUS FOR FEEDING PARTICULATE MATERIAL

BACKGROUND OF THE INVENTION

This invention relates generally to improvements in equipment for the handling of particulate material, such as granular plastics material, by feeding the material from a bulk supply to a supply hopper from which the material is dispensed to an injection or extrusion molding machine.

In general, plastics injection molding or extrusion machines include a barrel in which granular material is plasticated, such as by a screw, a nozzle at one end of the barrel and an inlet over which is mounted a feed hopper to supply particulate plastics material at the opposite end portion of the barrel. Although such feed hoppers may be large to hold an adequate supply of material, often they are comparatively small to facilitate emptying when, for example, the color of the articles molded by the machine is changed. However, whatever the size of the feed hopper, a supply of particulate plastics material must be maintained in the feed hopper, such maintenance in general requiring some kind of equipment to avoid constant visual inspection and/or manual handling of bags of the particulate plastics material. Presently available equipment for use in the maintenance of a supply of particulate material in the feed hoppers of injection molding machines is either insufficiently automatic in its operation or is insufficiently robust to withstand continuous operation under factory conditions.

Accordingly, it is one of the various objects of this invention to provide improved equipment for use in such handling of particulate plastics material which does not require more than a small amount of manual observation and yet which is robust and comparatively inexpensive in its construction. To this end and by way of example, the invention provides an ancillary supply hopper for the delivery of particulate material to the feed hopper of an injection molding machine. The supply hopper in its use is typically positioned over such a feed hopper and is adapted to supply a quantity of particulate plastics material from a bulk store of the material.

The supply hopper comprises a chamber, an inlet extending into the chamber connected by a conduit to a bin or other supply of the particulate plastics material. Extending from the chamber is an outlet having an outflanged portion providing a conical seating surface bounding the outlet. A conical valve is movable between a closed position in which a body portion of the valve seats against the conical seating surface and an open position separated therefrom. Also provided is a means to withdraw air from within the chamber to cause a reduced pressure in the chamber. The means comprises an air-entrainment device whereby a jet of air under pressure is blown through a venturi funnel extending from within the chamber to outside the chamber to draw air from the chamber. On creation of a sufficient reduction in pressure within the chamber, particulate plastics material is drawn from the store on a stream of air along the conduit and through the inlet into the chamber.

A control device may be provided, such as a manually operated switch, to cause the valve to be moved toward its closed position and to operate the air-entrainment device for a timed period. On completion of said period, the control device causes the valve to be moved toward its open position to dispense material from the supply hopper to the feed hopper.

Until the level of material in the feed hopper drops sufficiently, particulate material remains in the vicinity of the outlet and prevents seating of the valve so that pressure in the chamber is not reduced even on operation of the switch. To this end, particulate plastics material in the vicinity of the outlet becomes lodged between the body portion of the valve and the seating surface of the hopper and prevents complete closing of the valve. At this time, operation of the air-entrainment device draws air, preferentially into the chamber through the partially closed outlet, and fails to reduce pressure within the chamber sufficiently to cause particulate plastics material to be drawn from the store through the conduit and into the chamber.

When no particulate material remains in the vicinity of the outlet, such as when the feed hopper is partially empty, the valve is able to close completely and operation of the air-entrainment device is able to create a sufficiently low pressure in the chamber to draw particulate plastics material from the store into the chamber of the supply hopper. On completion of said period of time, the valve on opening allows the plastics material to fall from the outlet into the feed hopper.

Thus, one feature of the invention provides equipment for the handling of particulate material in which a control signal adapted to initiate supply of particulate material through the inlet into the hopper chamber will be effective only when no particulate material remains in the vicinity of the outlet.

The above and others of the various objects and several features of this invention will become clear from the following description, to be read with reference to the accompanying drawings of the illustrative supply hopper. It will be appreciated that this supply hopper has been selected to illustrate the invention by way of example only and not by way of limitation thereof. It should also be understood that the term "air" where used herein should be taken to include any gaseous medium and that particulate material may include powders as well as granular material.

Figure 2:
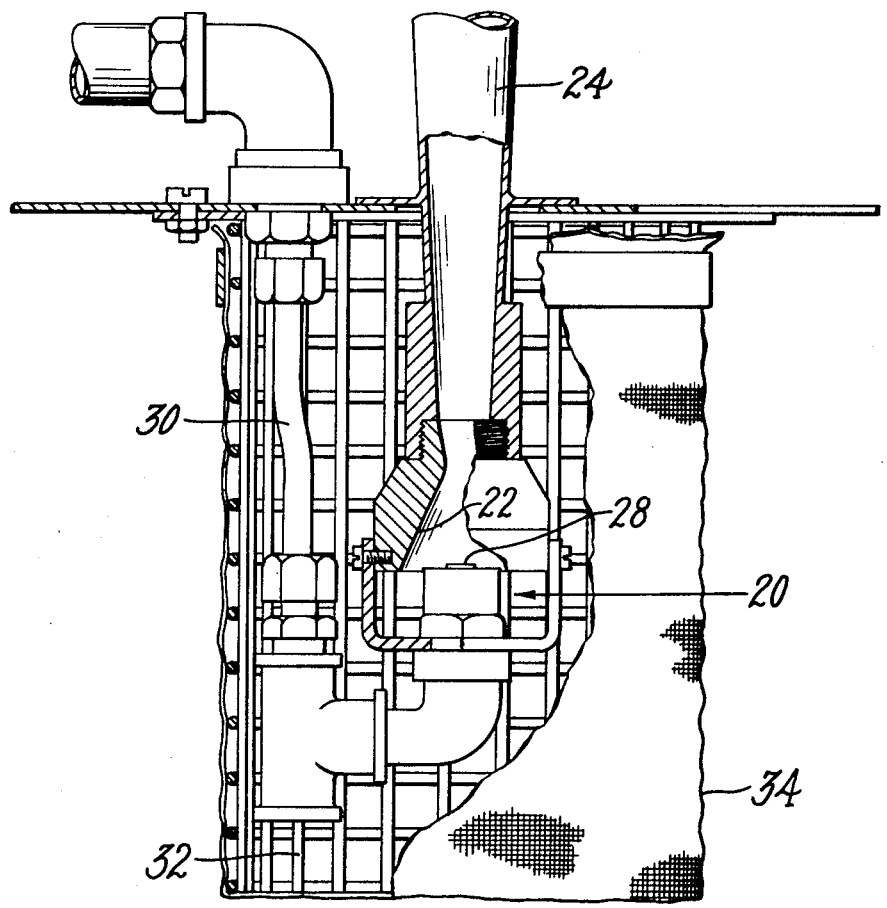
Figure 3:
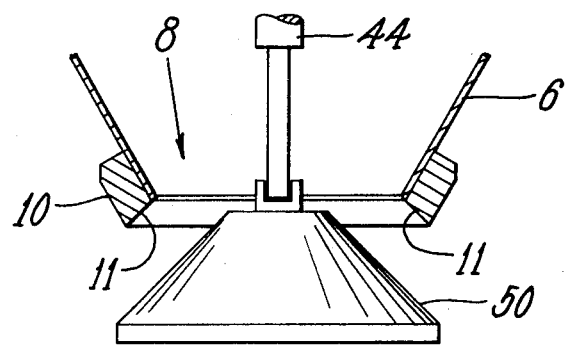

In the drawings:

FIG. 1 is a side view partly in section of a supply hopper embodying the invention; and FIGS. 2 and 3 are enlarged side views, also partly in section, of parts of the hopper.

The illustrative supply hopper is adapted to be secured over a feed hopper (not shown) of an injection molding machine to deliver granular material to the feed hopper. The supply hopper has a generally cylindrical body portion 2 having a detachable lid 4 and an inwardly tapering conical portion 6. The portion 6 extends to an outlet 8 and has a conical outflanged portion 10 provided with a seating surface 11 disposed around the outlet. The body portion 2, the lid 4 and the conical portion 6 together define a chamber 12 to which granular material is to be delivered and from which material is dispensed to the feed hopper. An air-entrainment device 20 (FIG. 2) is secured to the lid 4 and includes a venturi funnel 22, an exhaust pipe 24, and a nozzle 28 through which a jet of air under pressure may be blown through the venturi funnel 22 as supplied from a control device through an air pressure line 30. Mounted on the lid and enclosing the air-entrainment device 20 is a cage 32 over which a replaceable filter bag 34 is secured.

An air-operated piston/cylinder device 40 is mounted in the conical portion 6 generally coaxial with the outlet 8. Secured to the lower end portion of a piston rod 44 of the device 40 is a conical valve 50. When air under pressure is applied from the control device through a tube 42 to the device 40, the valve is moved to an open position (shown in FIG. 3) and, when air pressure is exhausted from the device 40, a spring 46 moves the valve toward a closed position as shown in FIG. 1. In the closed position, the valve seats against the frusto-conical seating surface 11 of the outflanged portion 10 to close the outlet 8. The hopper is provided with an inlet 56 which extends generally tangentially into the chamber 12 through an aperture in the body portion 2. Secured to the inlet on the outside of the chamber, and extending to a bulk supply (not shown) of granular plastics material, is a flexible conduit 58.

The control device (not shown) of the illustrative apparatus, adapted to initiate supply of particulate material through the inlet 56 into the chamber 12, may comprise a timing device and appropriate control valving. Air under pressure is normally applied to the line 42, maintaining the valve 50 open to dispense material from the supply hopper to the feed hopper. On operation of the switch, manually or by other convenient manner, the device 40 is vented to atmosphere, allowing the spring 46 to move the valve to its closed position. Air under pressure is then applied to the line 30 for an adjustable period of time whereupon air under pressure is applied to the line 42 to open the valve 50.

On operation of the switch when no granular material remains in the feed hopper in the vicinity of the outlet 8, the valve 50 seats on the surface 11 and the chamber 12 (with the exception of the outlet for the air-entrainment device 20 and the inlet 56,) is relatively airtight. When a jet of air is blown through the nozzle 28 into the venturi funnel 22, air is also drawn from the chamber 12 and expelled through exhaust pipe 24. On creation of a sufficiently low pressure in the chamber 12, air is drawn into the chamber 12 along the conduit 58 with sufficient speed to carry with it a stream of granular material from the bulk supply. The pressure of the jet of air, and the low pressure created in the chamber may be suitably tailored to the positioning of the bulk supply, the diameter of the conduit 58 and to the size and weight of the granules. When the feed hopper is full, so that no further material need be fed to the supply hopper, granular material remains in the vicinity of the outlet 8 and the valve 50 is prevented from seating on the surface 11. Thus, when the control switch is operated and the device 20 is activated, air is drawn through the outlet 8 and the pressure in the chamber 12 cannot be reduced sufficiently to draw material through the inlet 56. Therefore, even when the control switch is operated manually by an operator of the injection machine or cyclically by some other means, the operation of the supply hopper will be self-regulating and will not require constant operator inspection, for example, through observation panels as in prior devices. Furthermore, there is no need for automatic sensing mechanisms to indicate low levels of material in feed hoppers as in equipment heretofore available.

It should be understood that various equivalent devices may be substituted for those described without impairing the effectiveness of the apparatus. While one convenient form of control device has been referred to it should be obvious that other forms of electrical, fluid and mechanical controls and operating devices could be utilized. Furthermore, the controls could be operated periodically by an operator or cyclically, as determined by operation of a machine being fed without departing from the scope of the invention defined by the claims.

Having thus described my invention what I claim as new and desire to secure by Letters Patent of the United States is:

1. Apparatus for feeding particulate material including a chamber having an outlet and an inlet connected to a supply of said material, a valve for opening and closing said outlet, means for moving the valve away from the outlet to dispense material from the chamber in response to a demand signal and for moving the valve toward the outlet alternately to block dispensing of material in the chamber or to seal said outlet when the chamber is empty of material, means for drawing air from the chamber whereby when the valve seals the outlet a stream of air is drawn through the inlet to convey material from the supply into the chamber and when the valve is blocked from sealing by material in the chamber insufficient air is drawn through the inlet to convey material from the supply.

2. Apparatus according to claim 1 in which the drawing means includes an air-entrainment device in the chamber with a venturi funnel through which a jet of pressurized air is blown to draw air from the chamber through an exhaust tube and the valve moving means includes a piston/cylinder device which moves the valve away from the outlet when pressurized air is supplied thereto, pressurized air being supplied alternately to the air entrainment device and the piston/cylinder device.

3. Apparatus according to claim 2 and including a timing device for limiting the duration of supply of air to the air entrainment device.

* * * * *